United States Patent
Cheng et al.

(10) Patent No.: US 7,142,675 B2
(45) Date of Patent: *Nov. 28, 2006

(54) SEQUENCE GENERATOR AND METHOD OF GENERATING A PSEUDO RANDOM SEQUENCE

(75) Inventors: Lee Ming Cheng, Hong Kong (HK); Chi Kwong Chan, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 685 days.

This patent is subject to a terminal disclaimer.

(21) Appl. No.: 10/074,124

(22) Filed: Feb. 12, 2002

(65) Prior Publication Data

US 2003/0152221 A1    Aug. 14, 2003

(51) Int. Cl.
*H04L 9/00* (2006.01)
*H04K 1/00* (2006.01)
*H04L 9/28* (2006.01)
*H04L 9/06* (2006.01)
*G06F 1/02* (2006.01)
*G06F 7/58* (2006.01)

(52) U.S. Cl. .......... 380/46; 708/250; 708/252; 708/253; 708/255; 708/256; 708/270; 380/28; 380/29; 380/30

(58) Field of Classification Search .......... 380/29, 380/44, 46–47, 265; 708/250
See application file for complete search history.

(56) References Cited

U.S. PATENT DOCUMENTS

| | | | | |
|---|---|---|---|---|
| 4,748,576 A | * | 5/1988 | Beker et al. | 708/250 |
| 5,243,650 A | * | 9/1993 | Roth et al. | 380/237 |
| 5,365,585 A | * | 11/1994 | Puhl et al. | 380/265 |

\* cited by examiner

*Primary Examiner*—Ayaz Sheikh
*Assistant Examiner*—Longbit Chai
(74) *Attorney, Agent, or Firm*—Jackson Walker, LLP

(57) ABSTRACT

A sequence generator for generating a pseudo random sequence for random number generation or a stream cipher engine includes a plurality of linear feedback shift registers operable to generate a plurality of binary sequences. A plurality of nonlinear functions having the binary sequences as their input and operable to generate a second plurality of binary sequences. There are at least two switches and a controller including a shift register operable to control said first and second switches. The first switch is operative to select one of the second plurality of binary sequences to the first bit of the shift register, and the second switch is operative to select one of said second plurality of binary sequences to the output of the sequence generator.

10 Claims, 5 Drawing Sheets

SEQUENCE GENERATOR AND METHOD OF GENERATING A PSEUDO RANDOM SEQUENCE

BACKGROUND OF THE INVENTION

1. Field of the Invention

The invention relates to sequence generators and to the secure transmission of digital data within communication systems. More particularly, the present invention relates to the generation of cryptographically secure pseudo-random sequences suitable for fast encryption of digital data within communication systems.

2. Description of Prior Art

The security of many cryptographic systems depends upon the generation of unpredictable quantities that must be of sufficient size and random. Linear feedback shift registers (LFSRs) are a well-known and widely used basic component for the generation of a pseudo-random sequence having a long period and good statistical properties.

However, there exists a linear relation in a subsequence generated according to the LFSR method. Therefore, the initial value and the generating polynomial of the LFSR can be estimated by solving simultaneous linear equations obtained from a subsequence of the pseudo-random sequence generated according to the LFSR method.

To avoid this linearity problem, a combining function, whose inputs are taken from the outputs of several LFSRs in parallel, is used to destroy the linearity of the original sequence generated according to the LFSRs. In convention, the combining function employed is a fixed function. Therefore, the mapping defined by the combining function is a one-to-one mapping, and for the same input imposed on the combining function, the same output will be obtained. Such a generator suffers a divide-and-conquer attack if a correlation exists between the pseudo-random sequence and the output sequence of individual LFSRs. One solution could be to use the Data Encryption Standard (DES) to randomize the output but this is not economical as a substantial amount of hardware is required.

Generally stated, problems arise because pseudo-random sequence generators based on LFSRs are cryptographically unsafe and a substantial amount of hardware has to be used to make it safe.

SUMMARY OF THE INVENTION

It is an object of the present invention to provide a cryptographically secure pseudo-random sequence generator, or to overcome or at least ameliorate the above mentioned problems.

According to a first aspect of the invention there is provided a sequence generator including a plurality of linear feedback shift registers operable to generate a plurality of binary sequences, a plurality of nonlinear functions having said binary sequences as their input and operable to generate a second plurality of binary sequences, at least first and second switches, and a controller including a shift register operable to control said first and second switches, the first switch is operative to select one of said second plurality of binary sequences to the first bit of the shift register, and the second switch is operative to select one of said second plurality of binary sequences to an output.

According to a second aspect of the invention there is provided a sequence generator for generating a pseudo random sequence for random number generation or a stream cipher engine including a sequence generator operable to generate a first plurality of binary sequences, at least first and second nonlinear function generators having said first plurality binary sequences as their input, the first generator operative to generate a second plurality of binary sequences and the second generator operative to generate a third plurality of binary sequences, at least first and second switches, a controller having an input and at least first and second outputs operable to control said first and second switches, the first switch operable to select one said second plurality of binary sequences to the input of the controller, and the second switch operable to select one of said third plurality of binary sequences to an output.

Preferably, the sequence generator includes a plurality of feedback shift registers each operable to generate a binary sequence.

Preferably, the nonlinear function generators includes a plurality of boolean functions, each boolean function having the first plurality of binary sequences as an input and being operable to generate a binary sequence.

Preferably, the switches are multiplexers.

Preferably, the controller includes a shift register, the input of the controller being the first bit of the register and the outputs of the controller being at positions along the register.

According to a first aspect of the invention there is provided a method of generating a pseudo random sequence for random number generation or a stream cipher engine including generating a first plurality of binary sequences, applying a plurality of nonlinear functions to said first plurality of binary sequences to obtain an uncorrelated second plurality of binary sequences, and randomly selecting an output sequence from one of the second plurality of binary sequences.

Preferably, the nonlinear functions are arranged to provide a one-to-many relationship between the first and second plurality of binary sequences.

Preferably, the nonlinear functions are boolean functions.

Preferably, the output sequence is randomly selected by applying one of the second plurality of binary sequences to a shift register.

In the cryptographically secure pseudo-random sequence generator according to the invention a periodic sequence generator composes a first sequence of binary data. A pair of function generators produce a second sequence of nonlinear uncorrelated data. A pair of multiplexers randomly select the output from the function generators. A controller supplies signals selectively to the multiplexers. And one multiplexer provides an input signal to the controller and the other multiplexer provides the output signal.

The periodic sequence generator includes a series of linear feedback shift registers (LFSRs). Each LFSR generates a sequence of independent binary bit output. The outputs are fed into the function generators to increase the complexity.

The function generators are two groups of stacked nonlinear functions which are constructed using boolean functions. The outputs of the function generators have multiple bit width. One bit of the multi-bit output is selected dynamically via the multiplexers. This mechanism provides an improved uncorrelated binary sequences to avoid most statistical analysis attack.

The multiplexers are two groups of switches which decide the binary sequence output. The switches are activated by the signals received from the controller. One multiplexer provides a signal to the controller and the other multiplexer provides the sequence output.

The controller is a simple register generating an activation signal. The activation signal outputted from the controller will route back the multiplexers for computing its own input signal and to control and select the output sequence.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

The preferred embodiment of the present invention provides a Cryptographically Secure Pseudo-random Sequence Generator that is capable of generating a secure random sequence.

Figure 1:
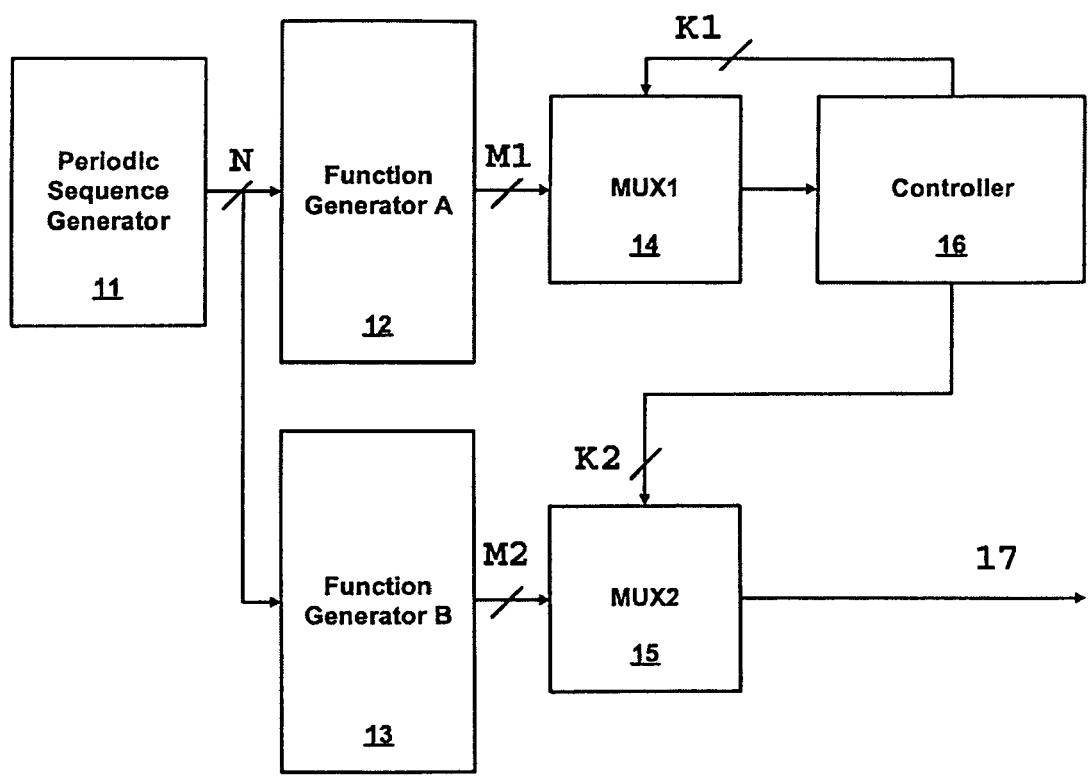
FIG. 1 is a block diagram of a cryptographically secure pseudo-random sequence generator according to the invention.

Referring to FIG. 1, the preferred embodiment of a Pseudo-random Sequence Generator according to the invention includes a Periodic Sequence Generator 11 the output N of which is provided to first and second Functions Generators 12, 13. The outputs M1, M2 of the first and second Function Generators 12, 13 is provided to the input of first and second Multiplexes (MUXS) 14, 15 respectively. A controller 16 having dual outputs K1, K2 provides a second input to each MUX 14, 15. The output from the first MUX 14 provides an input to the controller 16. The output from the second MUX 15 provides the output 17 of the Pseudo-random Sequence Generator.

Figure 2:
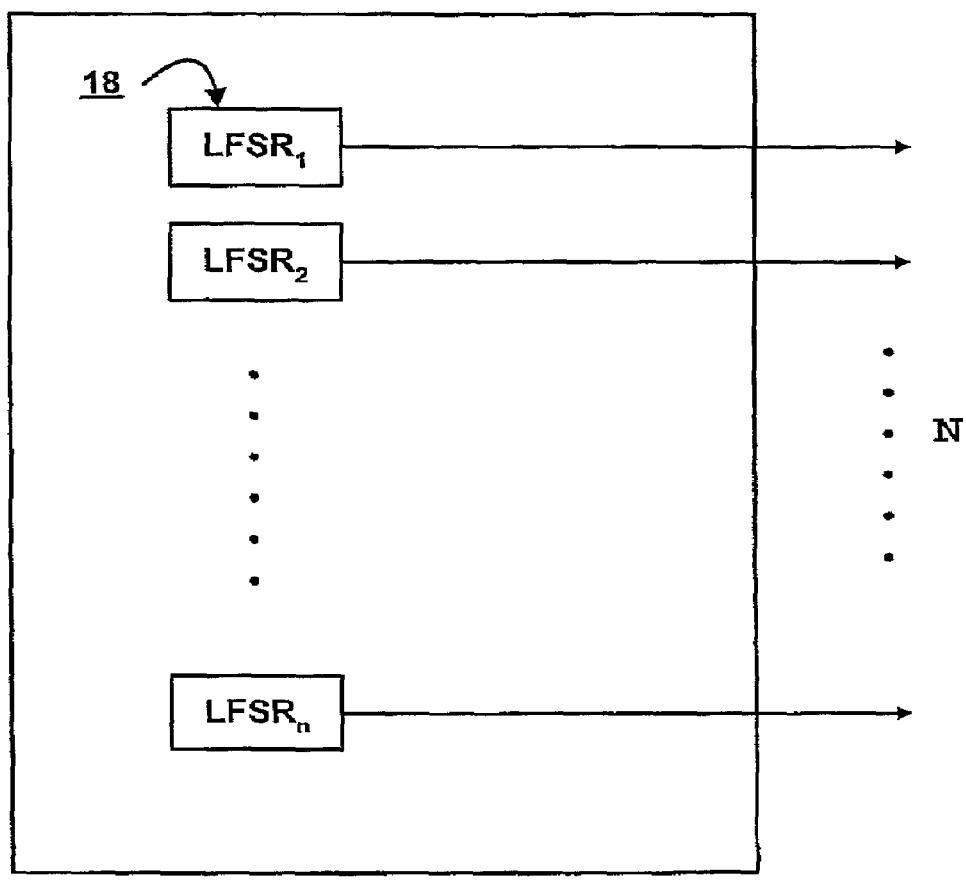
FIG. 2 is a block diagram of a periodic sequence generator.
Figure 3:
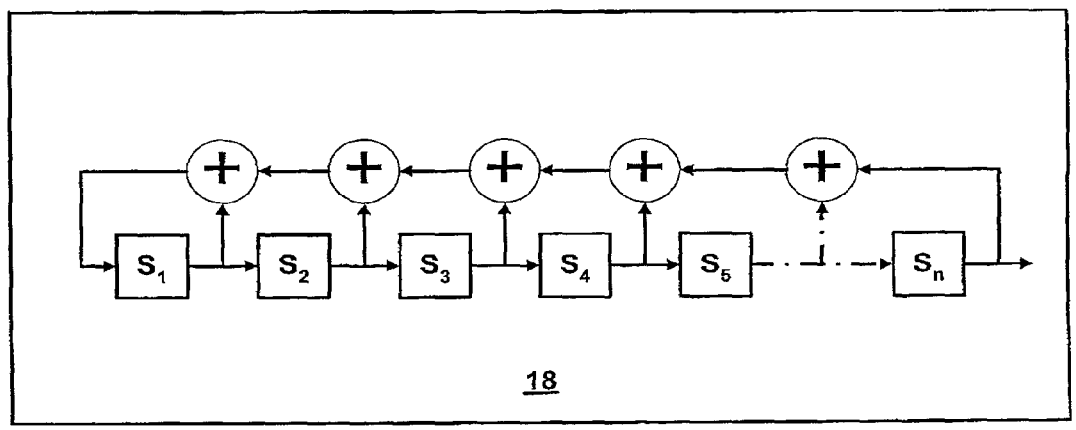
FIG. 3 illustrates a linear feedback shift register.

Referring to FIG. 2, the periodic Sequence Generator 11 consists of n Linear Feedback Shift Registers (LFSRS) is providing a n-bit output N. In the preferred embodiment there are 12 LFSRs providing a 12-bit output N. The general structure of the LFSRs 18 is shown in FIG. 3. In the preferred embodiment the LFSRs 18 have n elements S, but alternative embodiments may have more or less elements as will be apparent to the skilled addresses. The length of the n LFSRs 18 is pairwise relatively prime such that the output of the Periodic Sequence Generator 11 has a period of $$\Pi_i^n(2^{L_i} - 1)$$

where $L_i$ is the length of the i LFSR. The initial contents of the LFSRs 18 elements S are filled with a secret key for the Pseudo-random Sequence Generator. The n-bit output N of the Periodic Sequence Generator 11 goes into the Function Generators 12 & 13.

Figure 4:
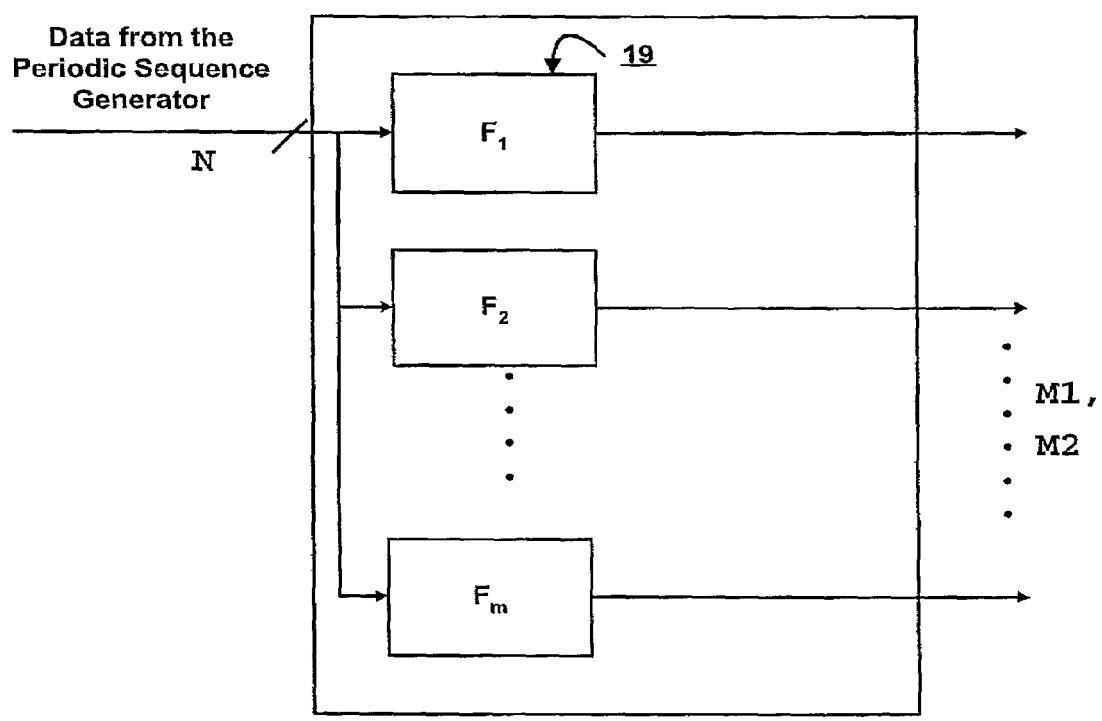
FIG. 4 is a block diagram of a function generator.

Referring to FIG. 4, the Function Generators 12, 13 comprise m n-bit Boolean functions 19, which generate the two m-bit outputs $M_1$ and $M_2$. In the preferred embodiment there are eight 12-bit Boolean functions 19 generating two 8-bit outputs.

The outputs M1, M2 of the Function Generators 12, 13 go into the inputs of the MUXs 14, 15 respectively. The first MUX 14 directs one of the bits from the m-bit input M1 to its output according to the input from Controller 16. Likewise, the second MUX 15 directs one of the bits from the m-bit input M2 to its output according to the input from Controller 16.

Figure 5:
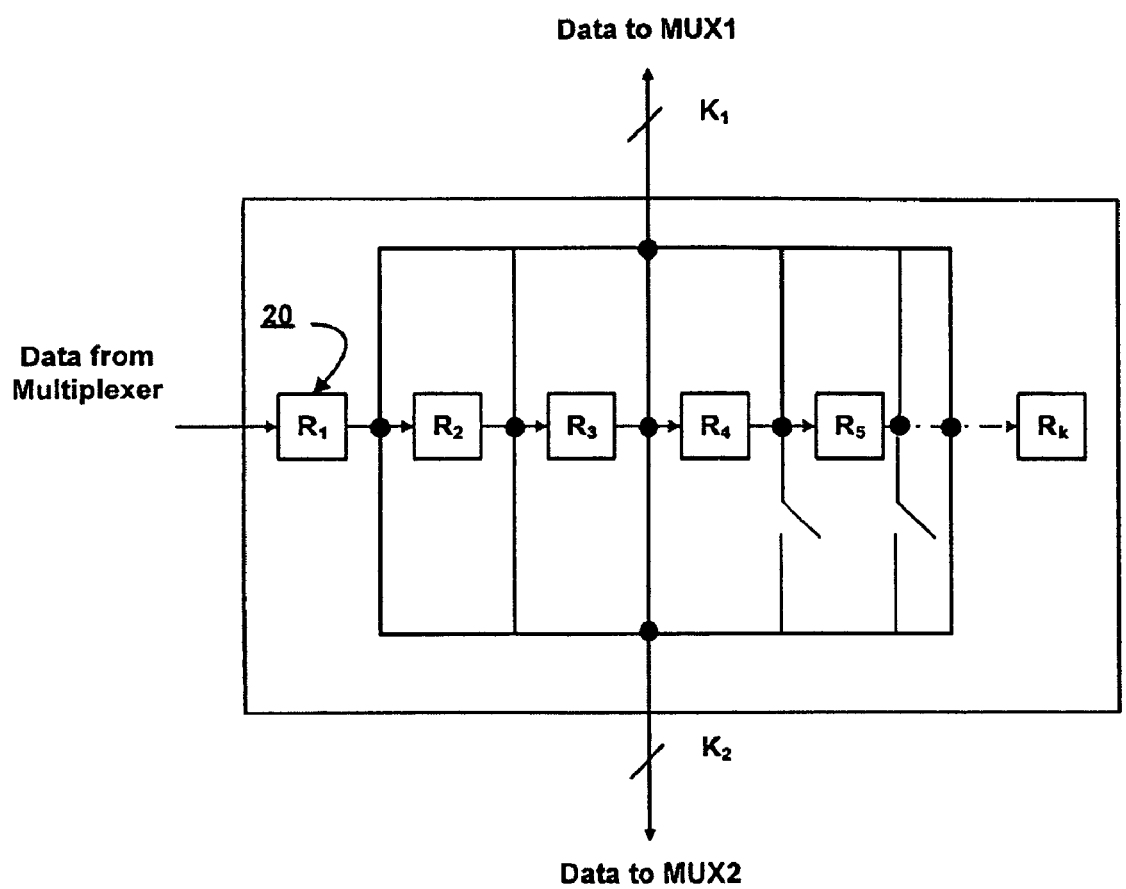
FIG. 5 is a block diagram of a controller.

Referring to FIG. 5, the Controller 16 is implemented as a shift register of k memory elements 20. In the preferred embodiment there are 10 memory elements 20. The output from first MUX 14 is shifted into the first (R1) memory element 20 of the Controller 16 at every clock cycle. The first output K1 of the Controller 16 forms the input to the first MUX 14 and the second output K2 of the Controller 16 forms an input to the second MUX 15. The selection of which memory location is used for the outputs K1 and K2 is arbitrary.

The output of the second MUX 15 forms the output 17 of the Pseudo-random Sequence Generator.

By selecting an output from the nonlinear functions 19 the mapping from the outputs of the LFSRs 18 (which form the inputs to the nonlinear functions 19) to the output 17 is not a one-to-one mapping, but is a one-to-many mapping. This eliminates the correlation between the output sequences of the LFSRs 18 "sub-generators" and the Pseudo-random Sequence Generator output. Thus the invention provides an improved cryptographically secure pseudo-random sequence generator which can be used for random number generation or in a stream cipher engine.

What is claimed is:

1. A sequence generator comprising:
   a plurality of linear feedback shift registers operable to generate a plurality of first binary sequences,
   a plurality of nonlinear function generators having said first plurality of binary sequences as their input and operable to generate a second plurality of binary sequences,
   at least first and second switches,
   a controller including a shift register operable to control said first and second switches,
   the first switch operative to select one of said second plurality of binary sequences to the first bit of the controller shift register, and the second switch operative to select one of said second plurality of binary sequences to an output.

2. A sequence generator for generating a pseudo random sequence for random number generation or a stream cipher engine comprising:
   a sequence generator operable to generate a first plurality of binary sequences,
   at least first and second nonlinear function generators having said first plurality binary sequences as their input, the first nonlinear function generator operative to generate a second plurality of binary sequences and the second nonlinear function generator operative to generate a third plurality of binary sequences,
   at least first and second switches,
   a controller having an input and at least first and second outputs operable to control said first and second switches,
   the first switch operable to select one said second plurality of binary sequences to the input of the controller, and the second switch operable to select one of said third plurality of binary sequences to an output.

3. A sequence generator according to claim 2 wherein the sequence generator includes a plurality of feedback shift registers each operable to generate a binary sequence.

4. A sequence generator according to claim 2 wherein the nonlinear function generators includes a plurality of Boolean functions, each Boolean function having the first plurality of binary sequences as an input and being operable to generate a binary sequence.

5. A sequence generator according to claim 2 wherein the switches are multiplexers.

6. A sequence generator according to claim 2 wherein the controller includes a shift register, the input of the controller being the first bit of the register and the outputs of the controller being at positions along the register.

7. A method of generating a pseudo random sequence in a sequence generator having a plurality of linear feedback shift registers and nonlinear function generators, the method comprising:

in the linear feedback shift registers, generating a first plurality of binary sequences, in the nonlinear function generators, applying a plurality of nonlinear functions to the first plurality of binary sequences to obtain an uncorrelated second plurality of binary sequences, and randomly selecting an output sequence from one of the second plurality of binary sequences.

8. A method according to claim 7 wherein the nonlinear functions are arranged to provide a one-to-many relationship between the first and second plurality of binary sequences.

9. A method according to claim 7 wherein the nonlinear functions are Boolean functions.

10. A method according to claim 7 wherein the output sequence is randomly selected by applying one of the second plurality of binary sequences to a shift register.

* * * * *